United States Patent
Files et al.

(10) Patent No.: US 12,300,407 B2
(45) Date of Patent: May 13, 2025

(54) CONNECTOR TO ATTACH WIRING TO A HOUSING

(71) Applicant: The Boeing Company, Chicago, IL (US)

(72) Inventors: Joe Files, Arlington, WA (US); Jeffrey Cartwright, Arlington, WA (US); Steven Ellis Rhynard, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 221 days.

(21) Appl. No.: 18/087,106

(22) Filed: Dec. 22, 2022

(65) Prior Publication Data

US 2024/0212883 A1    Jun. 27, 2024

(51) Int. Cl.
| | |
|---|---|
| *H01B 7/40* | (2006.01) |
| *F21V 23/00* | (2015.01) |
| *H02G 15/007* | (2006.01) |
| *F21W 107/30* | (2018.01) |

(52) U.S. Cl.
CPC ............. *H01B 7/40* (2013.01); *F21V 23/001* (2013.01); *H02G 15/007* (2013.01); *B64D 2221/00* (2013.01); *F21W 2107/30* (2018.01)

(58) Field of Classification Search
CPC ......... H01B 7/40; F21V 23/001; F21V 23/00; H02G 15/007; H02G 3/32; H02G 3/08; H02G 15/00; H02G 3/00; H02G 3/02; H02G 3/04; F21W 2107/30; F21W 2107/00; B64D 2221/00; B64C 1/406; B64C 1/40; F16B 21/088; F16B 21/08; F16B 5/0685; F16L 3/127

USPC ......... 174/135, 68.1, 68.3, 72 R, 72 A, 73.1, 174/84 R, 88 R, 70 A; 248/68.1, 70, 49, 248/62, 63, 73, 74.1, 74.2
See application file for complete search history.

(56) References Cited

U.S. PATENT DOCUMENTS

| | | | | |
|---|---|---|---|---|
| 7,041,904 | B2 * | 5/2006 | Da Silva ............ | H01R 13/5812 248/62 |
| 7,435,904 | B2 * | 10/2008 | Peterson ................. | H02G 3/00 174/72 A |
| 7,448,579 | B2 * | 11/2008 | Kwilosz ................ | F16L 55/035 248/74.1 |
| 8,013,248 | B2 * | 9/2011 | Sakata ................. | H02G 3/0691 248/62 |

(Continued)

FOREIGN PATENT DOCUMENTS

| | | |
|---|---|---|
| DE | 102006053966 A1 | 5/2008 |
| EP | 2325534 A1 | 5/2011 |
| EP | 2562432 A1 | 2/2013 |

OTHER PUBLICATIONS

EP Search Report mailed May 24, 2024 in re EP Application No. 23215323.9.

*Primary Examiner* — Angel R Estrada
(74) *Attorney, Agent, or Firm* — COATS & BENNETT, PLLC

(57) ABSTRACT

A connector to support wiring and space the wiring away from a housing. The connector includes a saddle that receives the wiring. A clip is attached to the saddle and attaches to the housing. The saddle and the clip are sized to secure the wiring to the housing. The size of the saddle and the clip spaces the wiring away from the housing to prevent the wiring from contacting the housing and potentially being damaged.

20 Claims, 10 Drawing Sheets

(56) References Cited

U.S. PATENT DOCUMENTS

| | | | | |
|---|---|---|---|---|
| 8,507,794 | B2* | 8/2013 | Wada | H02G 3/32 |
| | | | | 174/72 A |
| 8,991,773 | B2* | 3/2015 | Guthke | B64C 1/406 |
| | | | | 248/65 |
| 10,186,851 | B2* | 1/2019 | Peterson | H02G 3/32 |
| 10,634,180 | B2* | 4/2020 | Sawada | F16B 21/084 |
| 10,690,267 | B2* | 6/2020 | Pisacreta | F01D 25/28 |
| 2012/0037756 | A1 | 2/2012 | Guthke et al. | |
| 2014/0197217 | A1 | 7/2014 | Rebolloso et al. | |

* cited by examiner

CONNECTOR TO ATTACH WIRING TO A HOUSING

TECHNICAL FIELD

The present disclosure relates generally to the field of wiring and, more specifically, to connectors that are used to attach the wiring to a housing.

BACKGROUND

Lighting fixtures extend along the interior of aircraft. The lighting fixtures provide light to illuminate the interior to accommodate travelers and/or to facilitate cargo handling. The lighting fixtures include electrical wiring that runs along the length. Various regulations require the electrical wiring to be held tightly such as in a clamp or restraint and to maintain the wiring at a minimum spacing from components that could potentially damage the wiring.

Various designs have been considered to address the connection and positioning of the electrical wiring. One design includes using separate wiring mounting features. These mounting features are separate from the lighting fixtures and would be positioned in proximity to the lighting fixtures. An issue with this solution is the mounting features are too large to fit within the limited space available at the lighting fixtures. The mounting features would also make installation and removal of the lighting fixtures more difficult and would also impact adjacent commodities.

Another design repurposes existing plastic wire spacer blocks that are originally intended to create positive separation between adjacent wire runs. This approach is difficult to implement because the spacer blocks need to be secured and oriented in a specific manner to provide for the required spacing. Training and implementation materials needed for this design are not practical because it would be difficult to train the technique to technicians, would result in complicated and non-intuitive variations, and therefore would result in incorrect and/or inconsistent use of the spacer blocks.

Because of the limitations of these designs, an option for addressing the issue is applying for a deviation from the requirement for the aircraft design. However, deviations are generally granted for specific issues and are not broadly applicable. This would require repetitive deviations for similar situations. Additionally, the deviation process is tedious and must show that other methods of meeting the requirement are not viable.

SUMMARY

One aspect is directed to a connector to connect to a housing and to space wiring away from the housing. The connector comprises a clip configured to contact against and connect to the housing and a saddle comprising a first side and an opposing second side. The saddle has a height measured between the first side and the second side. The second side of the saddle is positioned away from the housing and the first side of the saddle is positioned towards the housing when the connector is connected to the housing. The height of the saddle spaces the wiring away from the housing when the wiring is positioned at the second side of the saddle.

In another aspect, the clip and the saddle are aligned in an overlapping configuration.

In another aspect, the clip comprises a base that receives the saddle and an extension that extends outward beyond the first side of the base with the extension configured to connect to the housing.

In another aspect, the first side of the base is perpendicular to an inner side of the extension.

In another aspect, the extension comprises fingers that are spaced apart by a gap with the fingers being flexible to bend into the gap upon the application of an exterior force.

In another aspect, the extension comprises a distal end spaced away from the base and further comprising an opening that extends through the extension and is located between the base and the distal end.

In another aspect, the saddle comprises a contact side configured to receive the wiring and rails on opposing sides of the contact side with the rails extending outward beyond the contact side and configured to extend along opposing sides of the wiring.

In another aspect, each of the clip and the saddle comprise elongated shapes with a longitudinal axis, the clip configured to be attached to the saddle with the longitudinal axis of the clip perpendicular to the longitudinal axis of the saddle.

In another aspect, the first side and the second side of the saddle are substantially planar and aligned in parallel planes.

In another aspect, the saddle comprises cut-out sections that are spaced apart along the length of the saddle with the cut-out sections comprising paired recesses that extend into the first side and the second side.

One aspect is directed to a connector to connect to a housing and to space wiring away from the housing. The connector comprises clip comprising a base with a first side and a second side and an extension that extends outward away from the first side of the base. An elbow is formed by the base and the extension with the elbow sized to receive a corner of the housing and position the extension on a first side of the housing and the extension on a second side of the housing. A saddle is positioned at the second side of the base and is configured to receive the wiring. The base and the saddle are in an overlapping configured and sized to space the wiring away from the housing when the wiring is positioned at the saddle and the corner of the housing is received in the elbow.

In another aspect, a fastener is configured to connect the saddle to the clip.

In another aspect, the first side of the base is perpendicular to an inner side of the extension.

In another aspect, the extension comprises a pair of fingers that are parallel to each other and spaced apart by a gap.

In another aspect, the extension comprises a distal end spaced away from the base and further comprising an opening that extends through the extension and is located between the base and the distal end.

In another aspect, the saddle comprises a second side that receives the wiring and rails that extend along opposing sides of the second side with the rails extending beyond the second side to maintain the wiring positioned over the second side.

One aspect is directed to a method of positioning wiring away from a housing. The method comprises: positioning a saddle on a housing with a first side of the saddle facing towards from the housing and an opposing second side of the saddle facing away from the housing; connecting a clip to the housing and securing the saddle to the housing; and receiving the wiring at the second side of the saddle and spacing the wiring away from the housing.

In another aspect, the method further comprises positioning an extension of the clip along a first side of the housing and a base of the clip along a second side of the housing and securing the extension to the first side of the housing.

In another aspect, the method further comprises positioning a corner of the housing in an elbow of the clip with the elbow formed by the extension and the base.

In another aspect, the method further comprises attaching the clip to the housing with a longitudinal axis of the clip being perpendicular to a longitudinal axis of the saddle.

In another aspect, the clip is a first clip and the method further comprises engaging a plurality of additional clips to the housing along a length of the housing with the first clip and the additional clips being spaced apart along a length of the saddle.

The features, functions and advantages that have been discussed can be achieved independently in various aspects or may be combined in yet other aspects, further details of which can be seen with reference to the following description and the drawings.

DETAILED DESCRIPTION

Figure 1:
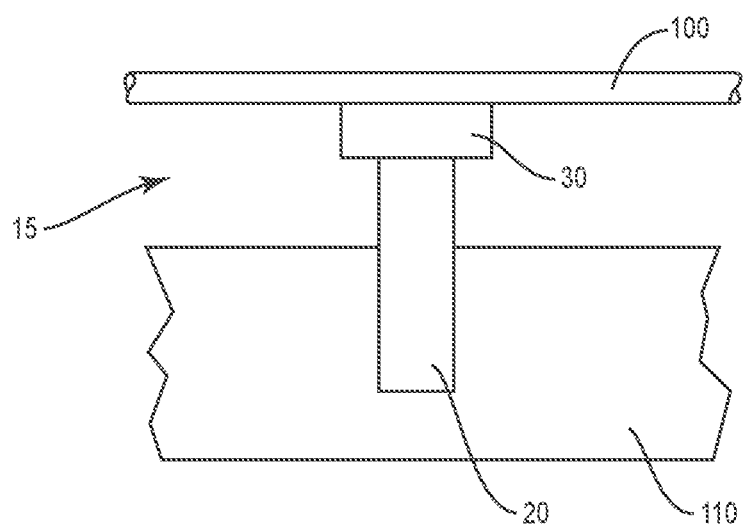
FIG. 1 is schematic side view of a connector for connecting to and spacing wiring away from a housing.

FIG. 1 illustrates a schematic diagram of a connector 15 positioned at a housing 110. The connector 15 includes a clip 20 that connects to the housing 110. A saddle 30 is positioned on the clip 20 and is configured to receive the wiring 100. The clip 20 and saddle 30 connect the wiring 100 to the housing 110 and space the wiring 100 away from the housing 110. This positioning prevents the wiring 100 from contacting against and potentially being damaged by the housing 110.

Figure 2:
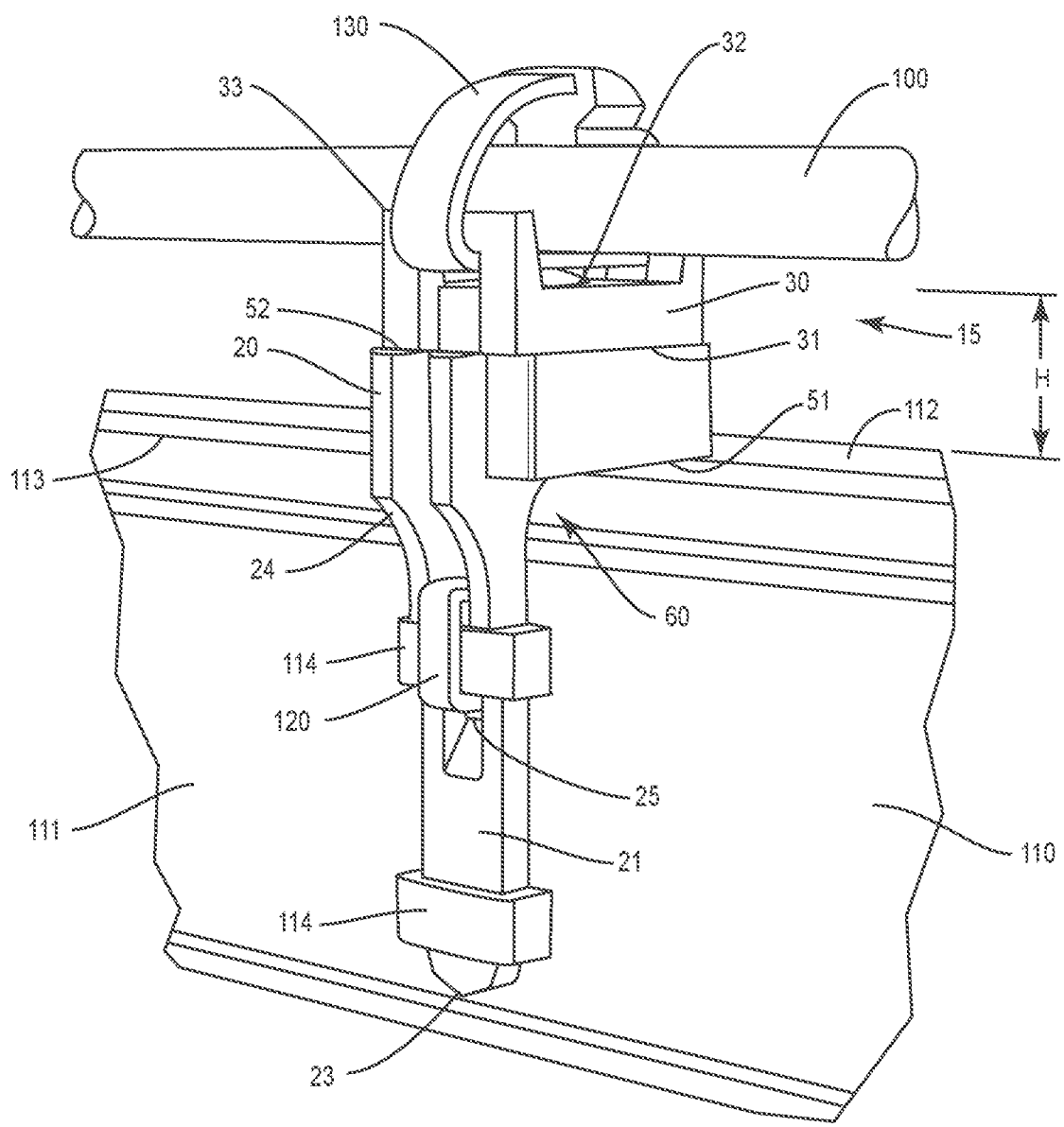
FIG. 2 is an isometric view of a connector attached to a housing and spacing wiring away from the housing.
Figure 3:
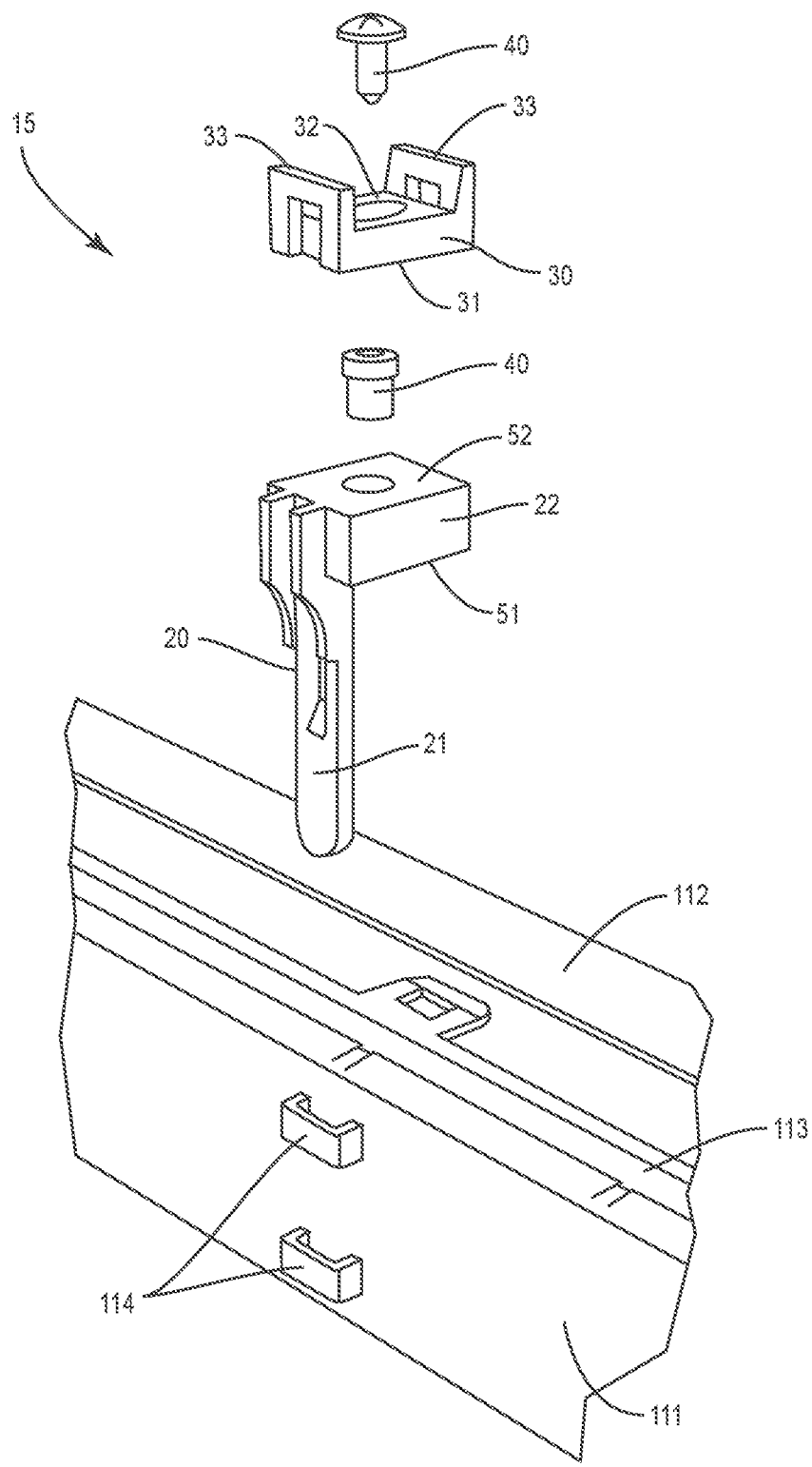
FIG. 3 is an exploded view of a connector.

FIGS. 2 and 3 illustrates an example of a connector 15 that connects the wiring 100 to the housing 110. The connector 15 includes a clip 20 configured to connect to the housing 110 and a saddle 30 that supports the wiring 100. The clip 20 includes an extension 21 and a base 22. The extension 21 and base 22 form an elbow 60 configured to receive a corner 113 of the housing 110. When the connector 15 is mounted on the housing 110, the extension 21 extends along a first side 111 of the housing 110 and the base 22 extends along a second side 112. In one example, the inner side of the extension 21 is substantially flat and extends in a first plane along the first side 111. The base 22 includes an inner side that is substantially flat and extends in a second plane along the second side 112. The first and second planes are substantially perpendicular. The elbow 60 formed by the inner sides is shaped to match the corner 113 of the housing 110. In one example, the elbow 60 has a curved shape as illustrated in FIGS. 2 and 3. In another example, the elbow 60 has an angular configuration (i.e., flat edges that intersect at 90).

The extension 21 includes a length that extends between a distal first end 23 and a second end 24 at the base 22. The first end 23 is exposed while the second end 24 is at the base 22. An opening 25 extends through the extension 21 in an area between the first end 23 and the second end 24. The opening 25 is configured to receive a lock member 120 to connect the clip 20 to the housing 110.

The extension 21 can include various shapes and configurations. FIGS. 2 and 3 include an extension 21 having a tapered shape at the first end 23. The tapered shape facilitates insertion of the extension 21 through one or more brackets 114 on the housing 110.

Figure 4:
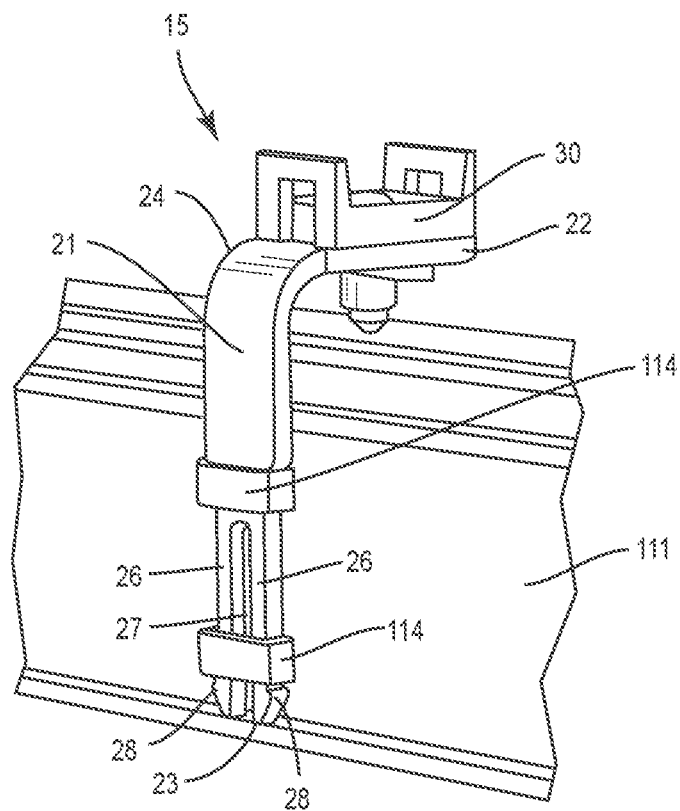
FIG. 4 is an isometric view of a connector attached to a housing.

FIG. 4 includes an extension 21 with a pair of fingers 26 that are spaced apart along the length by a gap 27. The fingers 26 are flexible and can be force inward into the gap 27 during insertion through the brackets 114. The distal end 23 includes ears 28 that extend radially outward. Once the ears 28 have moved through the brackets 114, the fingers 26 flex outward and the ears 28 move under the brackets 114 to prevent removal of the extension 21.

Figure 5:
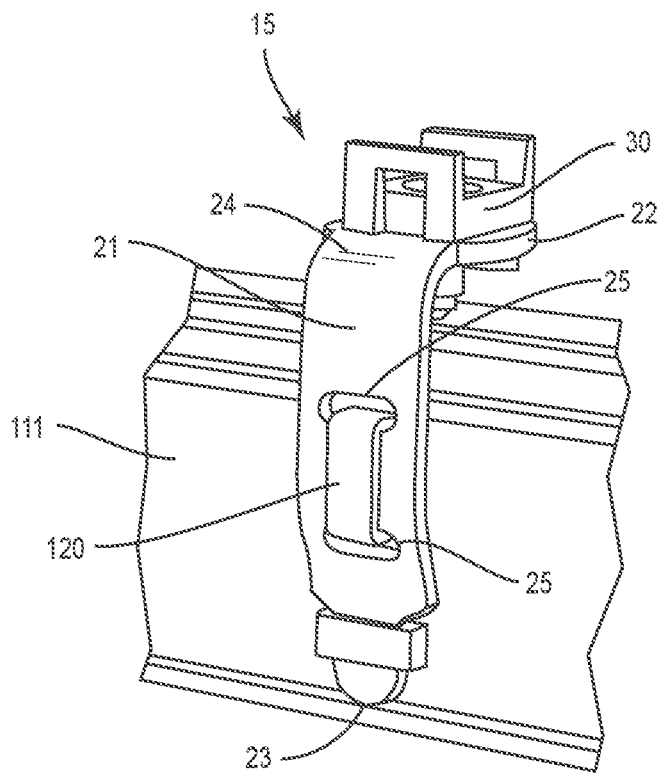
FIG. 5 is an isometric view of a connector attached to a housing.

FIG. 5 includes the distal end 23 being narrower than a proximal section of the extension 21 towards the second end 24. The narrower section has a width that fits into the bracket 114. A pair of openings 25 are positioned along the wider section of the extension 21 and configured to receive a lock member 120 to connect to the housing 110.

Figure 6:
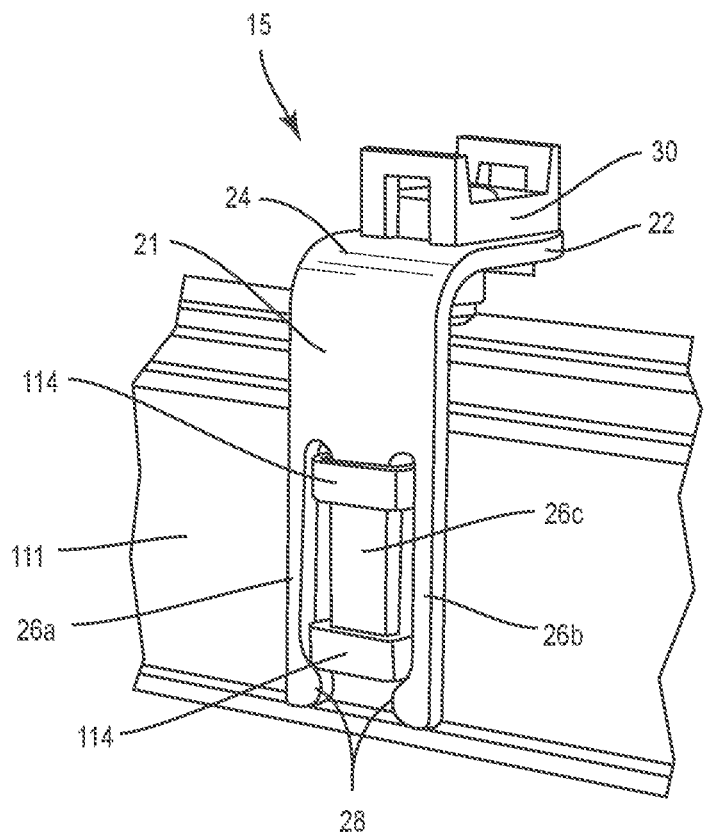
FIG. 6 is an isometric view of a connector attached to a housing.

FIG. 6 includes the extension 21 with three fingers 26a, 26b, 26c. The central finger 26c has a width sized to fit within the brackets 114. The outer fingers 26a, 26b are spaced radially outward on each side of the central finger 26c. The outer fingers 26a, 26b are positioned to be away from the brackets 114 when the extension 21 is connected to the housing 110. During insertion, the central finger 26c moves through the brackets 114 and the outer fingers 26a, 26b are on the outer sides of the brackets 114. Ears 28 on the inner edges of the outer fingers 26a, 26b contact against the brackets 114 and cause the fingers 26a, 26b to flex outward away from the central finger 26c. Once fully inserted, the ears 28 move beyond the last bracket 114 and the outer fingers 26a, 26b flex inward. The ears 28 are positioned directly under the last bracket 114 to prevent inadvertent removal.

In the various examples that include flexible fingers 26 and/or ears 28, a force above a predetermined amount can be applied to disconnect the extension 21 from the housing 110. The force causes the fingers 26 to flex to allow for movement of the extension 21 out of the one or more brackets 114. In one example, the fingers 26 are parallel to each other.

The base 22 is positioned at the second end 24 of the extension 21. The base 22 includes a first side 51 that faces towards the housing 110 when the clip 20 is connected to the housing 110, and an opposing second side 52 faces outward away from the housing 110. The first side 51 forms the one section of the elbow 60. In one example, the first side 51 is perpendicular to an inner side of the extension.

The saddle 30 is integral with the clip 20 and provides for receiving the wiring 100. As illustrated in FIGS. 2 and 3, the saddle 30 includes a first side 31 that faces towards the clip 20 and an opposing second side 32. The first side 31 is shaped and sized to be positioned on the base 22 of the clip 20. In one example, each of the first side 31 of the saddle 30 and the second side 52 of the base 22 are substantially planar. This provides for the two surfaces to contact together. The sides 31, 52 can also include other complementary shapes that provide for engagement. The second side 32 receives the wiring 100. The second side 32 can include various shapes, including but not limited to substantially flat and cupped shaped. Rails 33 extend upward from opposing edges of the second side. The rails 33 can provide for receiving a lock member 130 to secure the wiring 100. The rails 33 can also prevent/reduce the wiring 100 from inadvertently moving off the saddle 30.

Figure 7:
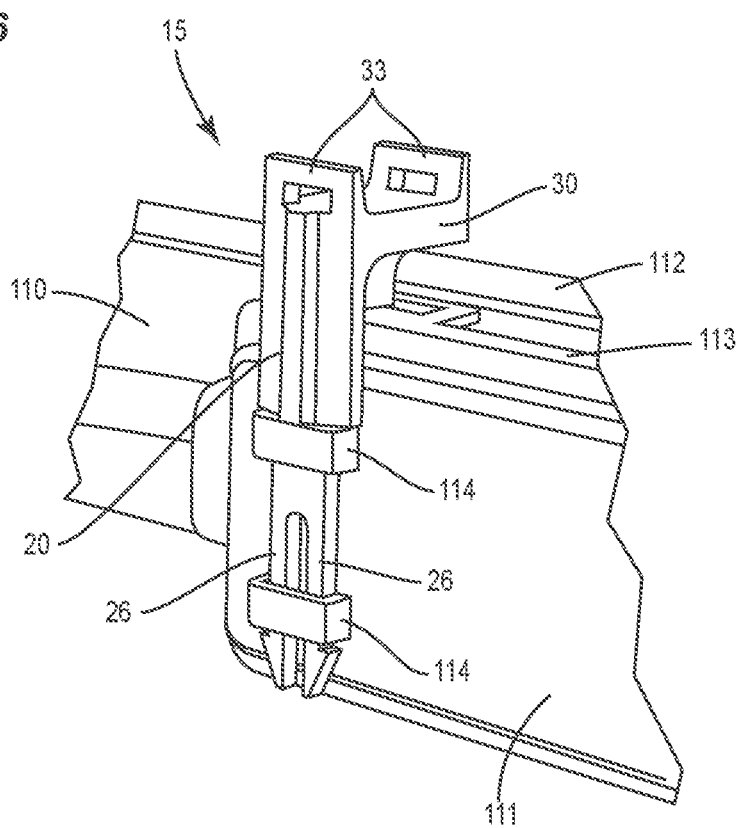
FIG. 7 is an isometric view of a connector attached to a housing.

The saddle 30 is attached to the clip 20. In one example, a mechanical fastener 40 attaches the saddle 30 and clip 20. In one example, the fastener 40 provides for the saddle 30 to pivot relative to the clip 20. This pivoting facilitates seating the wiring in the saddle 30 such as when the wiring 100 extends at different angles relative to the housing 110. The fastener 40 can extend through the base 22 and be exposed outward from the first side 51. As illustrated in FIGS. 4-6, the fastener 40 extends outward from the base 22 and spaces the base away from the housing 110. Additionally or alternatively, the saddle 30 is attached to the clip 20 with adhesives. In another example as illustrated in FIG. 7, the connector 15 includes a single, unitary construction with the clip 20 and the saddle 30 formed as a single piece. In one example, the connector 15 is a single molded piece.

In one example in which the saddle 30 and clip 20 are separate, these two pieces are connected together prior to mounting the connector 15 to the housing 110. In another example, the clip 20 is connected to the housing 110 and then the saddle 30 is connected to the clip 20.

The saddle 30 is positioned in an overlapping configuration with the base 22. As illustrated in FIG. 2, the overlapping configuration provides for the saddle 30 and base 22 to have a height H. This height H provides for spacing the wiring 100 away from the housing 110 when the wiring 100 is in the saddle 30.

Figure 8:
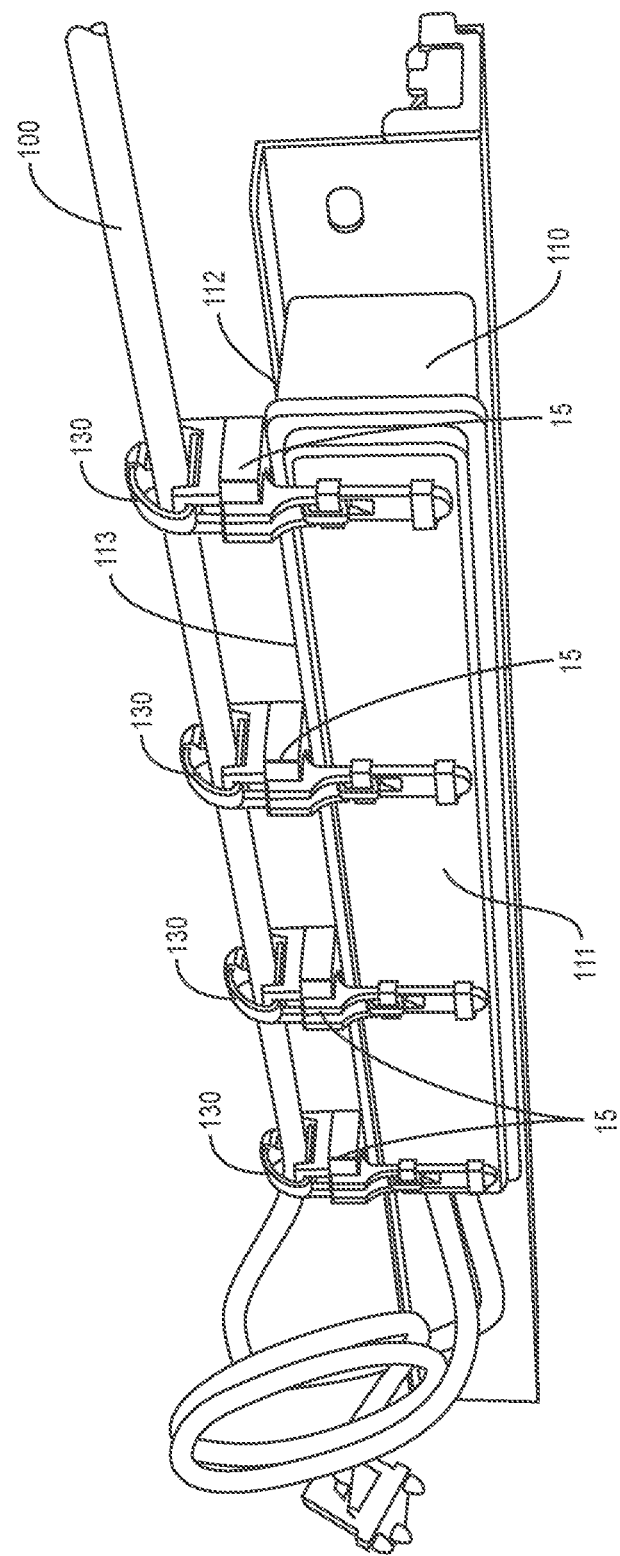
FIG. 8 is an isometric view of connectors connected to a housing and connecting wiring to the housing and spacing the wiring away from the housing.

FIG. 8 illustrates separate connectors 15 that are each connected to the housing 110 and support the wiring 100. Each of the connectors 15 is separately connected to the housing 110 and to the wiring 100. A lock member 130 secures the wiring 100 in each of the saddles 30. In examples with multiple connectors 15, the connectors 15 can be the same or different.

Figure 9:
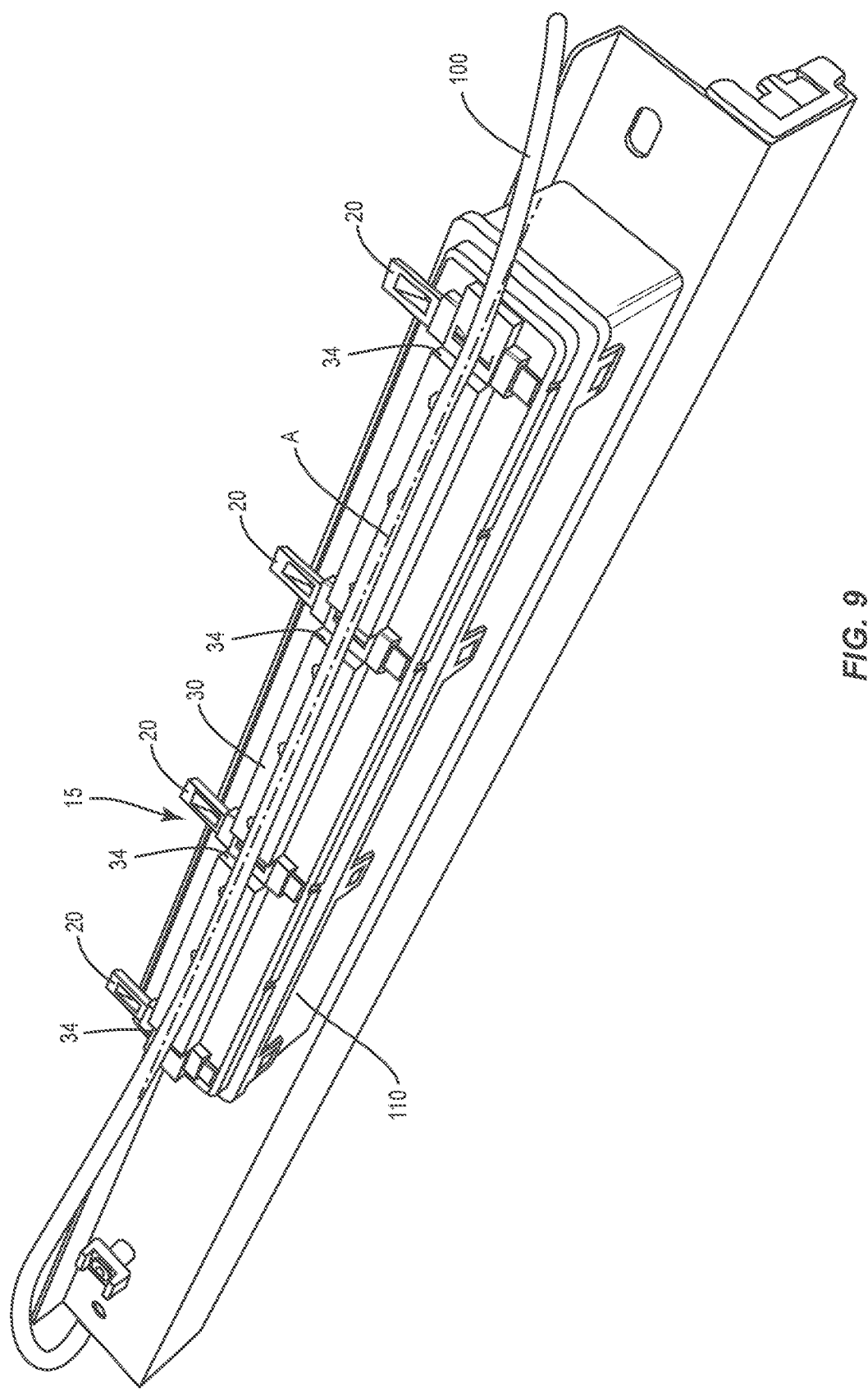
FIG. 9 is an isometric view of a connector connected to a housing and connecting wiring to the housing and spacing the wiring away from the housing.

FIG. 9 illustrates another example of a connector 15 configured to be attached to the housing 110. The connector 15 includes a saddle 30 configured to receive the wiring 100. One or more clips 20 are attached to the saddle 30 and secure the saddle 30 to the housing 110. The size of the saddle 30 spaces the wiring 100 away from the housing 110. This spacing prevents the wiring 100 from contacting the housing 110 and potentially being damaged.

Figure 10:
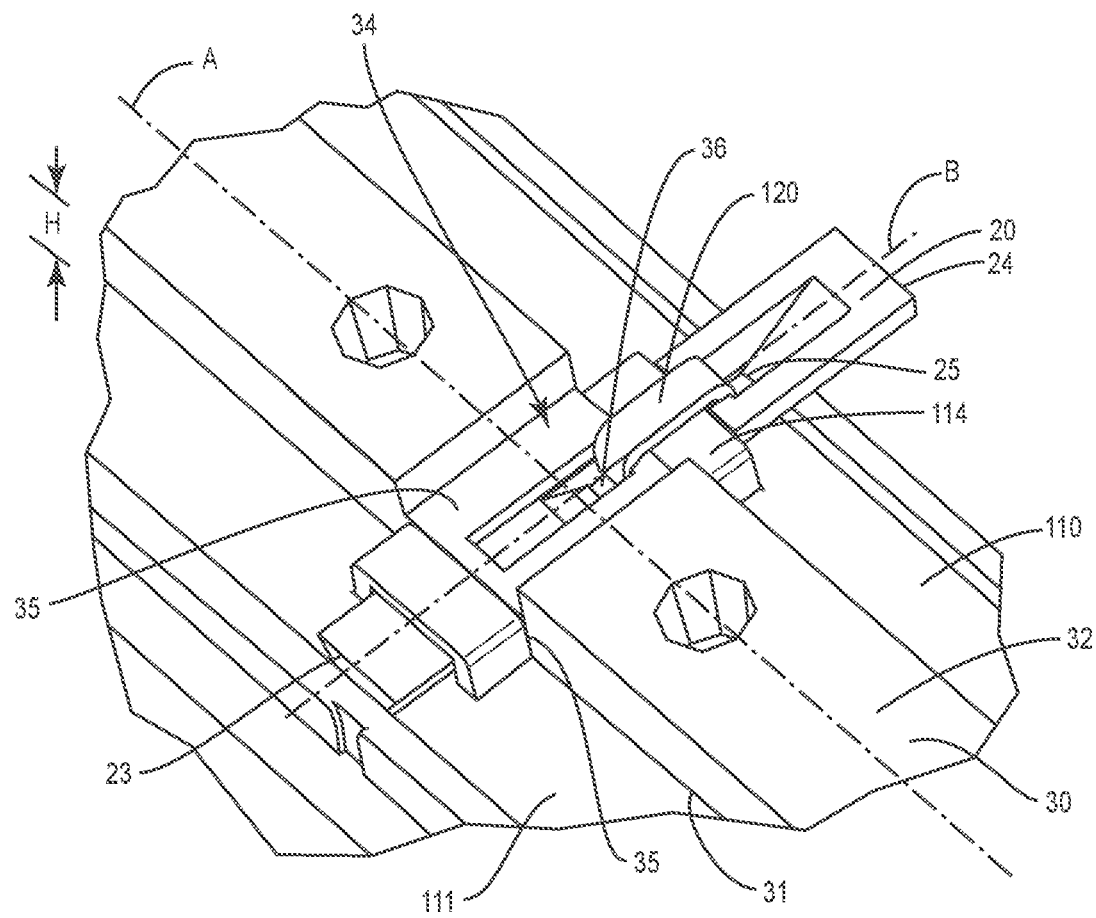
FIG. 10 is a partial isometric view of a clip attached to a housing and a saddle.
Figure 11:
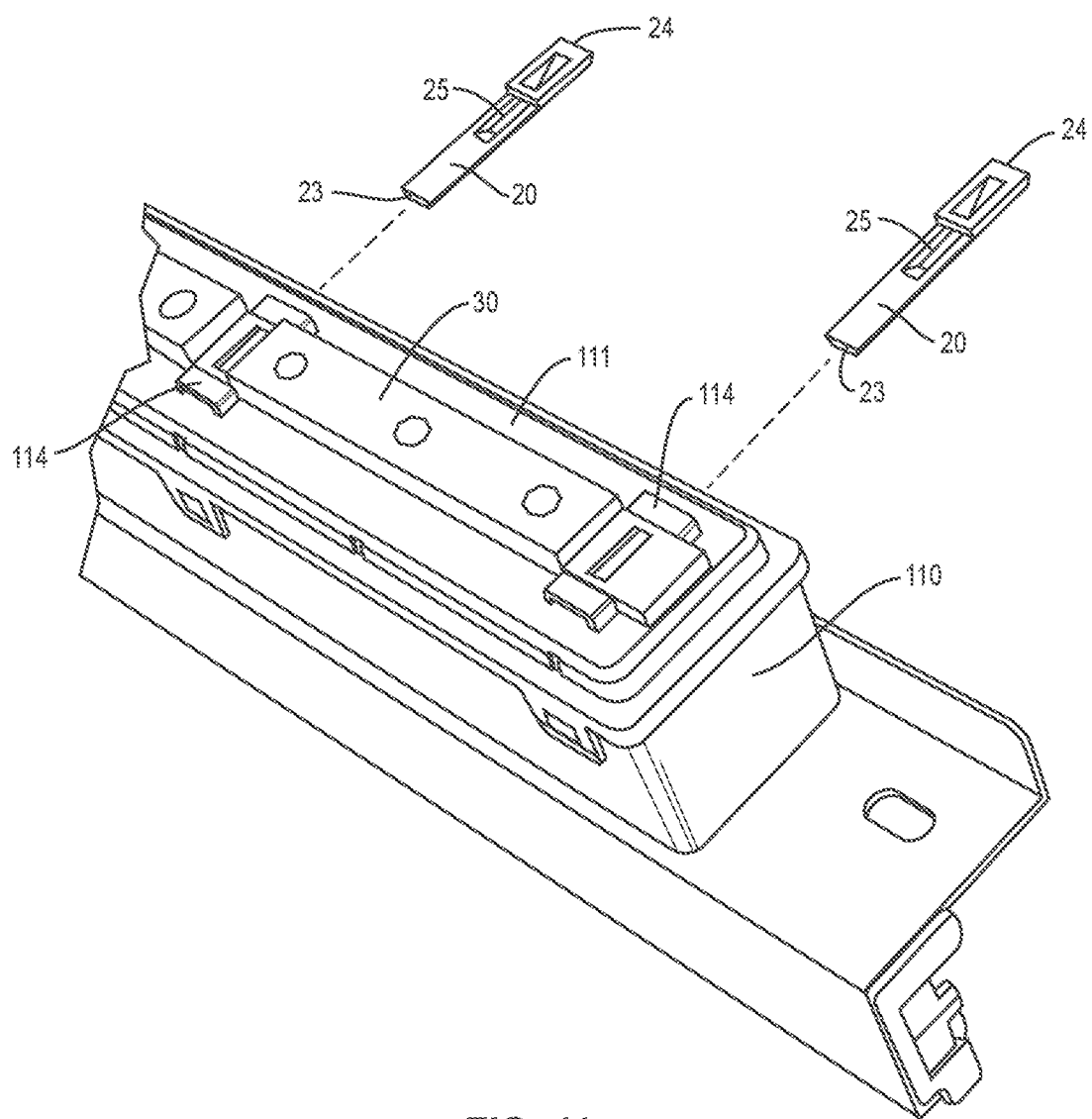
FIG. 11 is an exploded isometric view of clips for attaching a saddle to a housing.

The saddle 30 includes an elongated shape with a longitudinal axis A that extends along the length of the housing 110. As illustrated in FIG. 10, the saddle 30 includes the first side 31 that faces downward towards the housing 110 and an opposing second side 32 that faces upward when the saddle 30 is attached to the housing 110. The saddle 30 includes a height H measured between the first side 31 and the second side 32. The height H is sized to space the wiring 100 away from the housing 110 when the wiring 100 is supported on the second side 32. In one example, the second side 32 is substantially flat. In another example, the second side 32 has a scalloped shape to receive the wiring 100. In one example, the first and second sides 31, 32 are substantially planar and aligned in parallel planes.

One or more cut-out sections 34 are positioned along the length of the saddle 30. The cut-out sections 34 include recesses 35 that extend into both the first side 31 and the second side 32. The recess 35 in the first side 31 accommodates a bracket 114 on the housing 110. The recess 35 on the second side 32 includes an opening 36 that accommodates a lock member 120 that connects the saddle 30 to the bracket 114 and the clip 20. The number and spacing of the cut-out sections 34 varies to match the brackets 114 positioned along the housing 110.

The clip 20 attaches the saddle 30 to the housing 110. The clip 20 includes an elongated shape with the first end 23 and the second end 24. The clip 20 includes a longitudinal axis B that extends along the length. An opening 25 extends through the clip 20 and is positioned along the length between the ends 23, 24. The clip 20 includes a width sized to fit within a bracket 114 on the housing 110. Once inserted, the opening 25 on the clip 20 is aligned with the opening 36 on the saddle 30 to receive a lock member 120 to secure the clip 20 and saddle 30 to the housing 110. In one example, the longitudinal axis B of the clip 20 is substantially perpendicular to the longitudinal axis A of the saddle 30.

Figure 12:
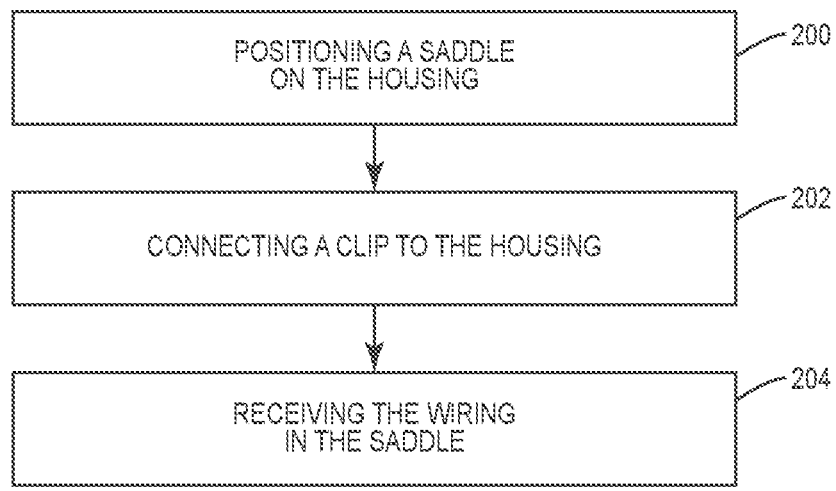
FIG. 12 is a flowchart diagram of a method of connecting wiring to a housing and positioning the wiring away from a housing.

FIG. 12 illustrates one method of connecting wiring 100 to a housing 110 and spacing the wiring 100 away from a housing 110. The method includes positioning a saddle 30 on the housing 110 with a first side 31 of the saddle 30 facing towards from the housing 110 and an opposing second side 52 of the saddle 30 facing away from the housing 110 (block 200). A clip 20 is connected to the housing 110 and secures the saddle 30 to the housing 110 (block 202). The method includes receiving the wiring 100 at the second side 32 of the saddle 30 and spacing the wiring 100 away from the housing 110 (block 204).

In one example, the clip 20 includes a dove-tailed shape that matches the shape of the interior of the bracket 114 to secure the clip 20 to the housing 110.

The housing 110 provides structural support for the connector 15. The housing 110 is a structure that can potentially damage the wiring 100 if the wiring 100 were to make contact. In one example, the housing 110 includes an exposed edge that could cut the wiring 100. In another example, the housing 110 has a relatively abrasive exterior that could rub against and damage the wiring 100. Examples include but are not limited to various equipment, hardware, and coverings. In one example, the housing 110 is a cover that extends around a power supply that provides power to lights within an aircraft.

Lock members 120, 130 are used to secure various components together. A variety of different lock members 120, 130 can be used, including but not limited to straps, wire, clips, staples, and clamps.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A connector to connect to a housing and to space wiring away from the housing, the connector comprising:
   a clip comprising an extension and a base, the clip configured to contact against and connect to the housing, the base comprising a planar first mounting surface;
   a saddle comprising a first side and an opposing second side, the saddle having a height measured between the first side and the second side, the second side of the saddle comprising a planar second mounting surface;
   a fastener that connects the clip and the saddle with the first mounting surface and the second mounting surface contacting together, the mounting surfaces and the fastener configured to enable the saddle to pivot about a pivot axis that is aligned along the extension of the clip;
   wherein the second side of the saddle is positioned away from the housing and the first side of the saddle is positioned towards the housing when the connector is connected to the housing; and
   wherein the height of the saddle spaces the wiring away from the housing when the wiring is positioned at the second side of the saddle.

2. The connector of claim 1, wherein the clip comprises:
   a base that receives the saddle; and
   an extension that extends outward beyond the first side of the base, the extension configured to connect to the housing.

3. The connector of claim 2, wherein the first side of the base is perpendicular to an inner side of the extension.

4. The connector of claim 2, wherein the extension comprises fingers that are spaced apart by a gap, the fingers are flexible to bend into the gap upon the application of an exterior force.

5. The connector of claim 2, wherein the extension comprises a distal end spaced away from the base and further comprising an opening that extends through the extension and is located between the base and the distal end.

6. The connector of claim 2, wherein the saddle comprises:
   a contact side configured to receive the wiring; and
   rails on opposing sides of the contact side, the rails extend outward beyond the contact side and configured to extend along opposing sides of the wiring.

7. The connector of claim 1, wherein each of the clip and the saddle comprise elongated shapes with a longitudinal axis, the clip configured to be attached to the saddle with the longitudinal axis of the clip perpendicular to the longitudinal axis of the saddle.

8. The connector of claim 1, wherein the first side and the second side of the saddle are planar and aligned in parallel planes.

9. The connector of claim 1, wherein the saddle comprises cut-out sections that are spaced apart along the length of the saddle, the cut-out sections comprise paired recesses that extend into the first side and the second side.

10. A connector to connect to a housing and to space wiring away from the housing, the connector comprising:
    a clip comprising:
    a base with a first side and a second side, the second side being planar;
    an extension that extends outward away from the first side of the base, the extension and the base connected together to prevent relative movement between the extension and the base;
    an elbow formed by the base and the extension, the elbow sized to receive a corner of the housing and position the extension on a first side of the housing and the extension on a second side of the housing, the elbow comprising a fixed shape;
    a saddle positioned at the second side of the base and configured to receive the wiring, the saddle comprising a planar side that contacts against the second side of the base to enable the second side of the base and the planar side of the saddle to seat together and to enable the saddle to pivot relative to the base to accommodate the wiring at different angular positions; and
    wherein the base and the saddle are in an overlapping configured and sized to space the wiring away from the housing when the wiring is positioned at the saddle and the corner of the housing is received in the elbow.

11. The connector of claim 10, further comprising a fastener configured to connect the saddle to the clip.

12. The connector of claim 10, wherein the first side of the base is perpendicular to an inner side of the extension.

13. The connector of claim 10, wherein the extension comprises a pair of fingers that are parallel to each other and spaced apart by a gap.

14. The connector of claim 10, wherein the extension comprises a distal end spaced away from the base and further comprising an opening that extends through the extension and is located between the base and the distal end.

15. The connector of claim 10, wherein the saddle comprises a second side that receives the wiring and rails that extend along opposing sides of the second side, the rails extend beyond the second side to maintain the wiring positioned over the second side.

16. A method of connecting wiring to a housing and positioning the wiring away from the housing, the method comprising:
    positioning a saddle on a housing with a first side of the saddle facing towards from the housing and an opposing second side of the saddle facing away from the housing;
    connecting a clip to a first side of the housing by inserting an extension of the clip through one or more brackets on the housing;
    positioning a base of the clip over a second side of the housing with the base being fixedly positioned relative to the extension;
    connecting the clip to the first side of the housing by connecting a lock to the extension and to one of the brackets;
    securing the saddle to the housing; and
    receiving the wiring at the second side of the saddle and spacing the wiring away from the housing.

17. The method of claim 16, further comprising positioning an extension of the clip along a first side of the housing and a base of the clip along a second side of the housing and securing the extension to the first side of the housing.

18. The method of claim 17, further comprising positioning a corner of the housing in an elbow of the clip with the elbow formed by the extension and the base.

19. The method of claim 16, further comprising attaching the clip to the housing with a longitudinal axis of the clip being perpendicular to a longitudinal axis of the saddle.

20. The method of claim 16, wherein the clip is a first clip and further comprising engaging a plurality of additional clips to the housing along a length of the housing with the first clip and the additional clips being spaced apart along a length of the saddle.

* * * * *